United States Patent [19]

Gagliardi

[11] Patent Number: 4,890,109
[45] Date of Patent: Dec. 26, 1989

[54] LIGHTWEIGHT, BROADBAND, PULSED, FREQUENCY AGILE, SELF-SCREENING JAMMER FOR AIRBORNE DEPLOYMENT

[75] Inventor: Richard P. Gagliardi, Ridgecrest, Calif.

[73] Assignee: The United States of America as represented by the Secretary of the Navy, Washington, D.C.

[21] Appl. No.: 819,073

[22] Filed: Jul. 13, 1977

[51] Int. Cl.[4] .......................... G01S 7/38; G01S 13/86
[52] U.S. Cl. ....................................... 342/14; 342/202
[58] Field of Search ................. 343/18 E; 342/14, 15, 342/202

[56] References Cited

U.S. PATENT DOCUMENTS

| 4,017,856 | 4/1977 | Wiegand | 342/15 |
| 4,217,550 | 8/1980 | Blassel et al. | 342/14 X |
| 4,307,400 | 12/1981 | Miley | 342/14 |

Primary Examiner—Thomas H. Tarcza
Assistant Examiner—Gilberto Barrón, Jr.
Attorney, Agent, or Firm—William C. Townsend; Melvin J. Sliwka

[57] ABSTRACT

A broadband RF microwave source is used to generate a high-energy, narrow pulse which is used to provide the illuminating signal for an active radar system while simultaneously jamming other active radar systems. The generation of the RF microwave energy utilizes a spark gap generation system. Jamming is accomplished by overload ringing of the receiver portion of the other radar systems.

10 Claims, 4 Drawing Sheets

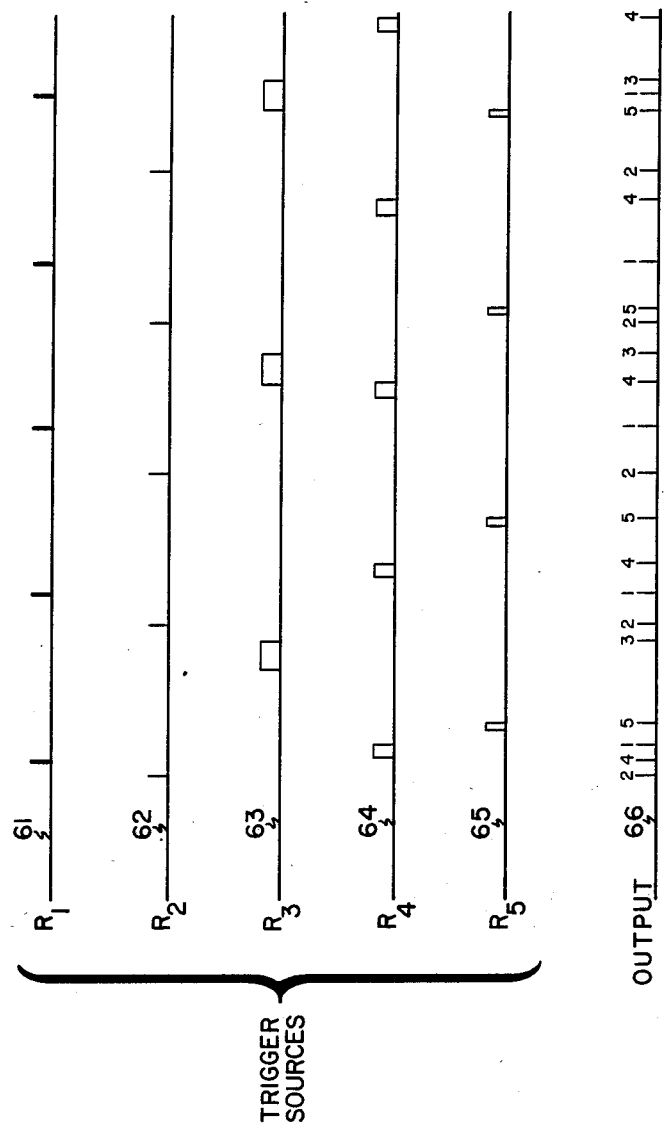

LIGHTWEIGHT, BROADBAND, PULSED, FREQUENCY AGILE, SELF-SCREENING JAMMER FOR AIRBORNE DEPLOYMENT

BACKGROUND OF THE INVENTION

1. Field of the Invention

The field of the invention relates to electromagnetic energy propagation. More particularly, the invention pertains to the field of microwave ranging and detection. In still greater particularity, the invention pertains to a system furnishing bursts of microwave energy that are synchronized to external sources. By way of further characterization, but without limitation thereto, the invention is described as it pertains to a self screening deceptive jammer and high-resolution radar.

2. Description of the Prior Art

Present zones of approach to geographical areas are guarded by highpower, all-weather, long-range radar systems. In order to make a successful penetration of these approach areas it is necessary to make the detection of exact course and position by these radars ineffectual, thereby avoiding active interdiction. Past methods have employed false actual targets, such as drones or chaff, or false virtual targets.

The use of false actual targets is dependent upon the guarding radar to be unable to discriminate between the false target and the intruding vehicle. Similarly active jamming requires the production of a synchronized "genuine looking" signal which is beyond the discrimination ability of the radar. Also, the elimination of electromagnetic emissions that might be passively detected has, heretofore, been required of both systems. This requirement precludes the use of active radar by the intruding vehicle that might be used for navigation.

Of course, there have been attempts to generate spurious target returns which would be received as pucka echos by the guard radar. However, as equipment has become more sophisticated, it has become increasingly more difficult to generate acceptable "looking" returns. For example, it has been difficult to fool radars operating asynchronously on more than one frequency. Similarly, to generate spurious returns having the correct bandwidth and signal amplitude has presented design problems beyond satisfactory solution within the cost and circuit-complexity limitations imposed on the design of operational military electronic systems.

SUMMARY OF THE INVENTION

This invention overcomes these difficulties of prior art designs by providing a high-power deceptive pulse which overloads the radar being jammed to cause ringing. The ringing produces a signal of the correct bandwidth. This pulse generation uses a spark-excited microwave generator. The timing of the spark excitation is obtained from a received pulse from the guarding radar to be jammed. The received pulse is envelope detected and processed to include a predetermined delay before being used to modulate the spark excited transmitter. An additional feature of the present invention permits the transmitted jamming pulse to be used as an illuminating transmission for an active radar system to be used by the approaching aircraft, or other vehicle, such that radar navigation may be practiced. Thus, the provision of an active radar jamming system employing ringing overload principals suitable for active radar purposes is a fundamental object of the invention.

BRIEF DESCRIPTION OF THE DRAWINGS

FIG. 5 is a pulse waveform diagram showing how the system functions in the presence of plural radar systems.

Referring to FIG. 1, a receiving antenna indicated at 11 receives ambient microwave pulse energy and transfers it via suitable electrical connections to broadband signal processor 12. Broadband signal processor 12, in turn, provides the necessary electrical amplification of the signals and couples these signals to envelope detector 13. Thus, antenna 11, broadband signal processer 12, and envelope detector 13 are seen to comprise a signal responsive means for receiving ambient microwave energy.

Figure 1:
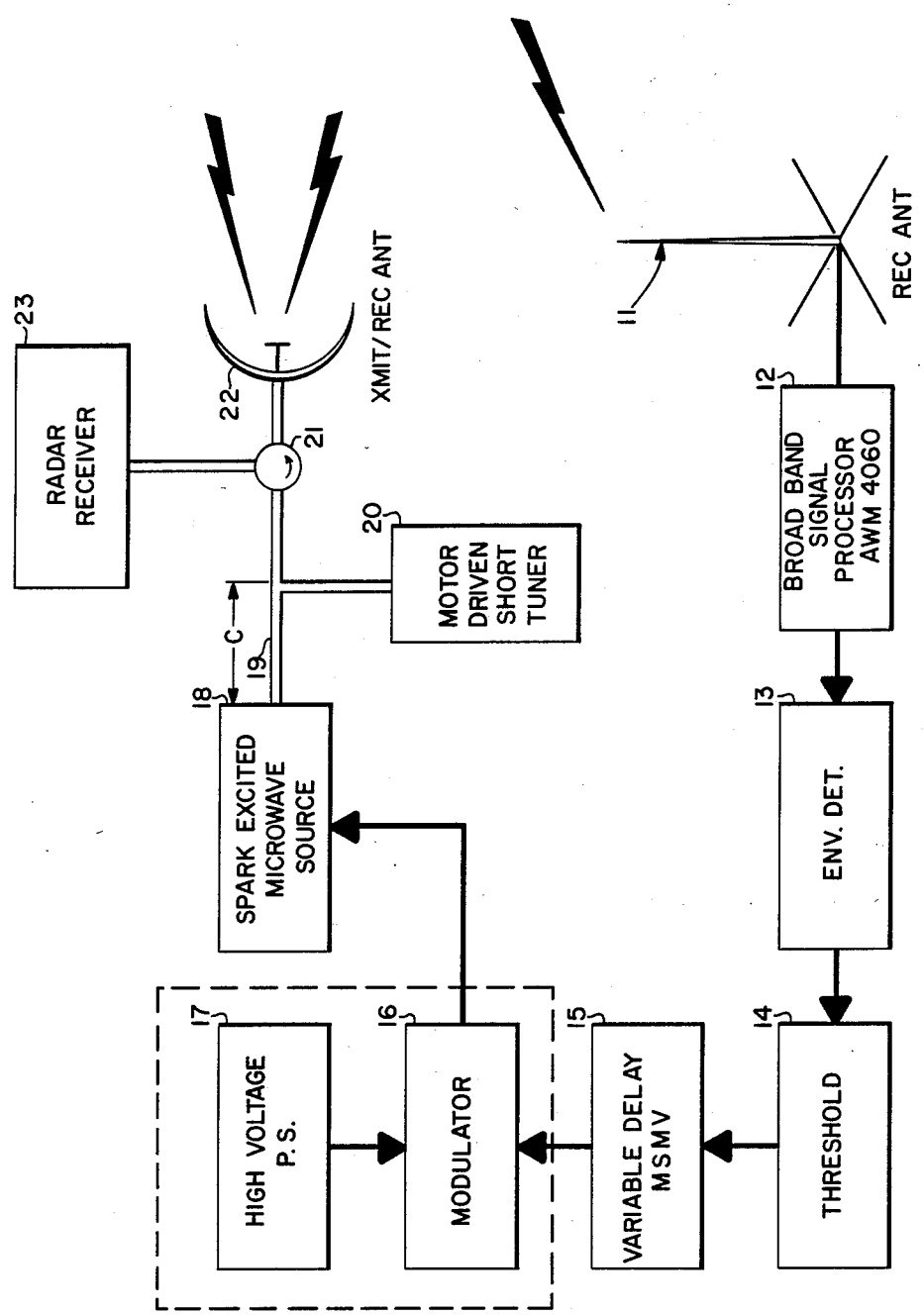
FIG. 1 is a block diagram of the invention.

The output of envelope detector 13 may, if desired, be threshold processed by a threshold circuit 14 to assure that the system does not respond to pulses of ambient microwave energy below a predetermined value. The threshold of the signals are fed to a variable delay monostable multivibrator 15 which provides for a predetermined amount of processing delay in the response of the system to the ambient microwave energy. The output of variable delay 15, in turn, coupled to a modulator which includes a high voltage power supply 17 which is switch by a modulator circuit 16.

The output of modulator 16 applies a high voltage DC pulse to a spark excited microwave source 18. As will be described herein, spark excited microwave source 18 may be either a travatron or a cavatron. The output of a spark excited microwave source 18 is connected to conventional microwave plumbing, shown at 19, which provides for microwave transmission therefrom. At a predetermined distance, indicated at C, from spark excited microwave source 18 is motor driven short tuner 20. This shorted tuner causes a resonant frequency pulling of the spark excited microwave source.

The theory of frequency pulling of microwave cavities is well known. Normally, most applications of transmission line tuners are oriented toward tuning out a given reactance or mismatch such that the transmission path is nearly non-reactive at the point of discontinuity. Here, however, the effect of tuner 20 is to do the opposite of what is normally done. That is, tuner 20 tunes in reactance. Since we are dealing with radiated pulses of one nanosecond in duration, a frequency tuning effect would not be possible were the discontinuity located further than a nanosecond, about 0.5 feet, away from the RF source. Hence, C in FIG. 1 must be of a dimension less than the radiated pulse width in linear dimensions. This arrangement results in a frequency agility by reactive pulling of the spark excited microwave source 18.

The mathematical investigation of the parameters of typical installations will indicate that a very useful amount of frequency agility may be introduced by this relatively simple technique. This is possible because the radiating systems that have gigahertz bandwidths have very low Q. Q is of course, the ratio of center resonant frequency to bandwidth. Calculating an example of the above, a cavatron of standard type producing a 100 kilowatt output and uses a rigid waveguide, WRS970U36, which operates in the 0.9 to 3.5 gigahertz range and has a breakdown of 182 kilowatts of average power. With a short burst of microwave energy occurring at a center frequency of 2.26 gigahertz, it may be shown that the highest amplitude of oscillation would have a pulse duration of approximately 0.4 nanoseconds and the Q of the system would be approximately 0.846. The resultant spectral spread would cover the entire waveguide band in the normal sine of x over x pattern. To obtain a full high power coverage of this entire band it is necessary to resort to frequency agility, such as described above.

Using standard calculation formula such as given in "Microwave Transmission Design Data" by Theodore Moreno, Dover Publications, 1958, Page 231 ff. It may be seen that in 200 nanoseconds the system changes frequency approximately 1.95 gigahertz or at a rate of 10 megahertz per nanosecond. This change produces a change in the voltage standing wave ratio of approximately 2 to 1. Thus, it may be seen that the useful output is obtained over the entire frequency band transmitted by the waveguide 19, and, indeed, the entire radar frequency range of interest. The resonant frequency in waveguide 19 is connected to antenna 22 via a duplexer 21. Echo returns from the transmitted signal are received by antenna 22 and transferred to a radar homodyne receiver 23 for conventional processing by duplexer 21. If a disposable jamming system is desired, radar receiver 23 may, of course, be omitted and with it duplexer 21.

Figure 2:
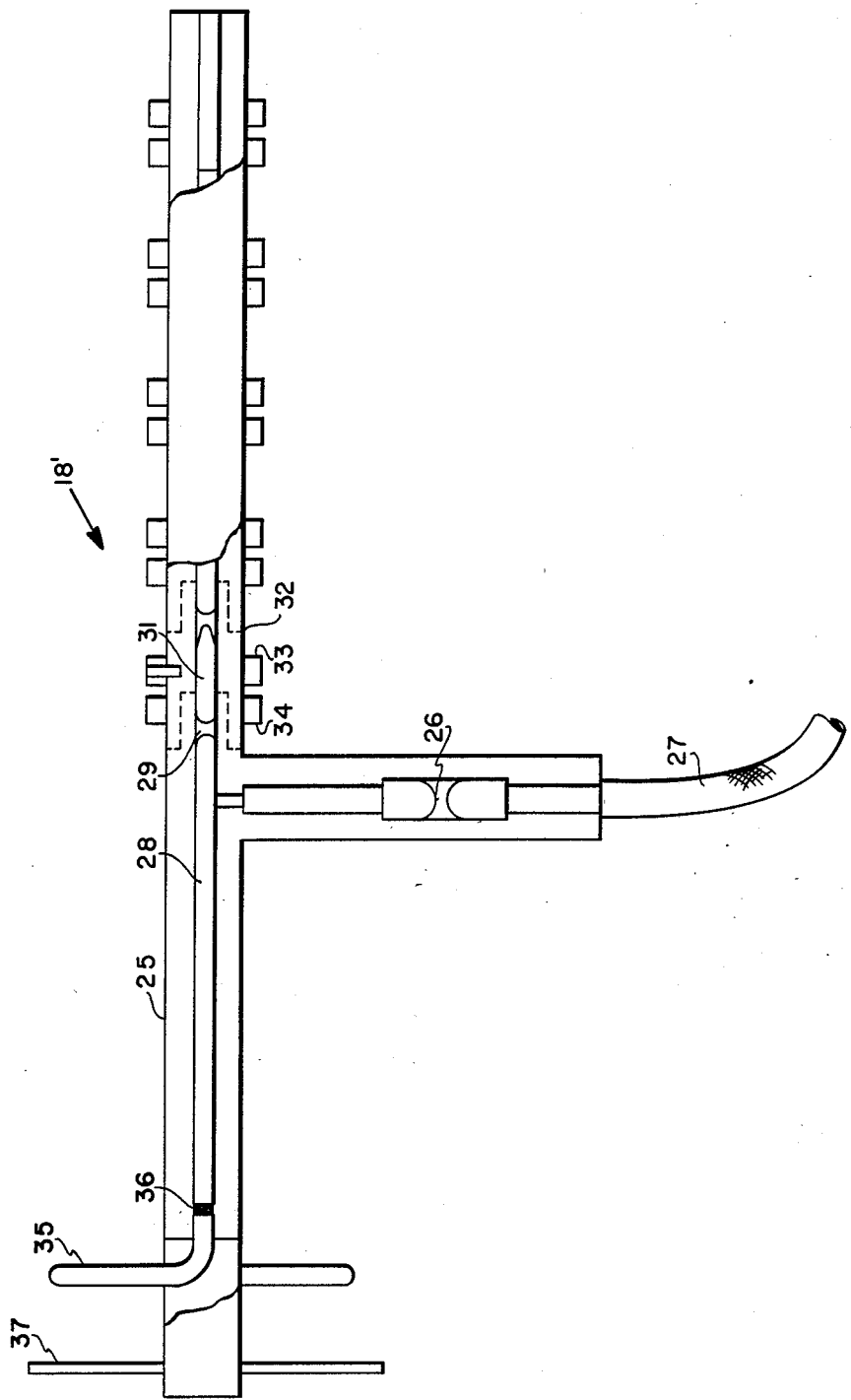
FIG. 2 is a simplified cut-away view of a travatron used in the invention.

Referring to FIG. 2, the constructional details of a travatron indicated at 18' used in the practice of the invention. This travatron may be, for example, of the type A variety manufactured by IKOR of Burlington, Mass. The travatron comprises a generally T shaped housing shown at 25 which houses, in the stem of the T, a spark gap 26. The dimensions of spark gap 26 are such that the breakdown voltage exceeds that of the other spark gaps comprising the device. A high voltage video pulse is applied to gap 26, via co-axial feed 27, to produce a high voltage breakdown of gap 26. This breakdown launches the video pulse in a direction to the right of FIG. 2 where it successively encounters either an open circuit or a matched length of transmission line. The open circuit is the unfired spark gap indicated at 29 which is the gap between central conducter 28 and a short stub 31. Stub 31 is held in a threaded section 32 by means of a lock screw indicated at 33. Section 32 is threaded on the cross of T shaped housing 25 to establish the desired gap 29.

This gap is of such dimensions that it breaks down in half of the RF period the the traveling wave. When this gap fires, the traveling wave continues to the right a distance of a quarter wave length where it encounters another discontinuity of the next gap. As shown, there are five such gaps in the illustrated travetron although, as will be determined by engineering tradeoffs, a greater or smaller number may be used.

When the reflection from the second gap, toward the first gap, encounters the first gap, the first gap is still fired or conducting. This conduction exists because 10 nanoseconds are required to quench each of the included gaps in the cross of the T shaped housing. By successive reflections, RF energy is generated as each reflection travels through the requisite number of quarter wave gaps and delays to establish the full RF cycle.

The RF energy thus produced is capacity coupled to a dipole 35 by means of a capacitor 36 formed in center conductor 28. A reflector 37 provides the desired directivity and antenna gain of the system. Reflector 37 may be a dipole type of reflector or a dish type reflector as deemed desirable. Additional theoretical considerations and constructional details is given in U. S. Pat. No. 3,484,619 issued on 16 Dec. 1969 to J. Proud for "RF Generator".

Figure 3:
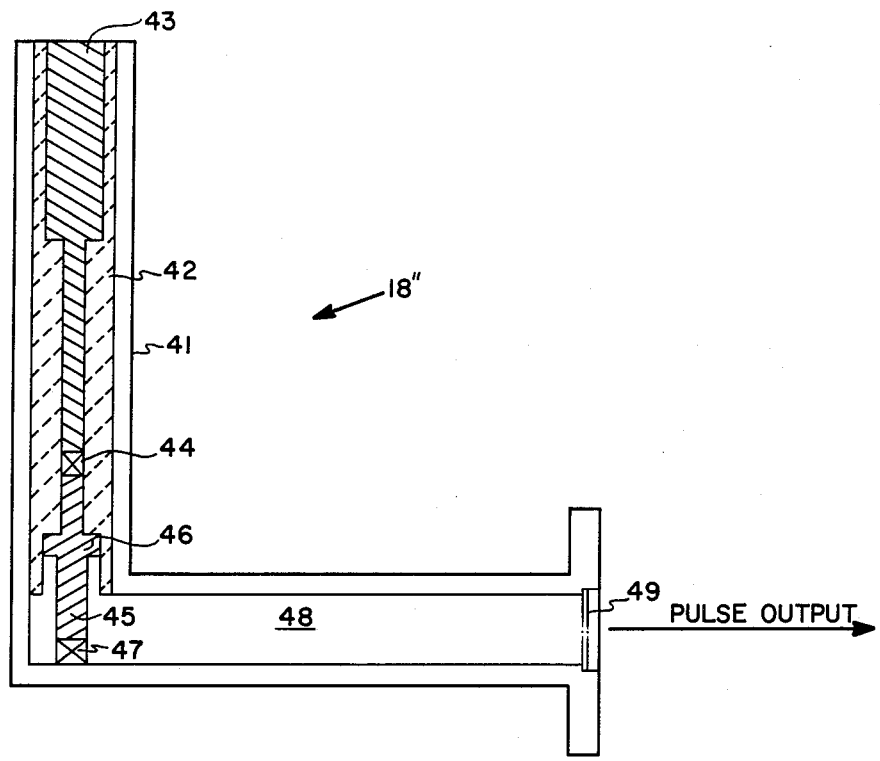
FIG. 3 is a simplified cut-away of a cavatron used in the invention.

Referring to FIG. 3, another variety of spark excited microwave generator means useful in the practice of the invention is illustrated. In this variety, known as a cavatron, the RF energy is generated by cavity resonance. As shown, a generally L shaped housing 41 has a metallic center conductor 43 extending therein and separated from the walls thereof by a ceramic insulator 42. A primary spark gap 44 transfers high energy DC video pulses applied to electrode 43 to a shaped conductor 45. Conductor 45 has an inductive choke section 46 to control transmission directions in the well understood fashion. A secondary gap 47 functions in the same fashion as the plurality of gaps of the device illustrated in FIG. 2 to set up standing or traveling wave oscillations in conductor 45. These oscillations are coupled to a cavity 48 in the bottom of the L shaped housing 41 where they exit via an RF window 49. Cavity 48, as well as spark gaps 47 and 44, may be conveniently filled with an inert gas, as is conventional in microwave devices.

Figure 4:
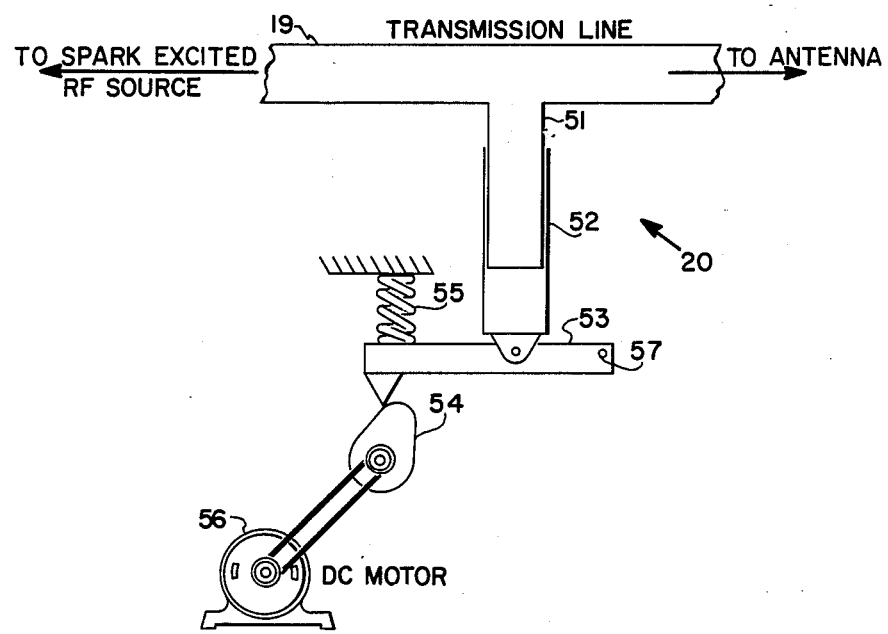
FIG. 4 is a motor driven frequency control circuit used to make the circuit frequency agile.

Referring to FIG. 4, the construction of motor driven short tuner 20 is illustrated. As shown, a section of waveguide 19 is interrupted by a feed section 51 which is terminated by a shorted telescoping section 52. Section 52 is moved by a rocker arm 53 connected thereto and driven by means of a cam 54 and a suitable resilient means, such as spring 55. Cam 54 is, in turn, driven by a DC motor 56 to cause rocker arm 43 to oscillate about pivot 57. This oscillation carries with it telescoping section 52 which lengthens and shortens the resonant cavity formed by section 51.

Of course, other constructions than the telescoping hollow slide section shown may be used, if desired. For example, in a twin conductor transmission line, a shorting stub may be moved through predetermined dimensions to effect the same change of resonant frequency. Likewise, the drive arrangement illustrated should be considered as exemplary of many drive systems which may be used in the practice of the invention with the expected engineering trade-offs.

DESCRIPTION AND OPERATION

The operation of the system of FIG. 1 is essentially the sequential and combined operations of the individual components previously described. It should be noted that the variable delay introduced by delay 15 may be adjusted to provide for apparant target returns at a different downrange distances than the actual jammer. Additionally, the thresholder may be adjusted to permit the system to initiate responses from its own target returns such as would be produced by ground clutter. This thresholder may be set with a view in mind of the duty cycle of the spark excited microwave source and power supply. As will be readily understood, the system produces voltage outputs of approximately one half nanosecond of many orders of magnitude higher than the target returns from the radars to be jammed.

Analyzing the effect that the short-duration, extremely high-power pulses have on the jammed radar receiver, one considers the basic theory of resonant band pass filters and IF strips in the victim radars as being matched filters. Ideally, as given by any standard work in the subject, the IF filters will, of course, be matched to the transmitted pulse of the victim radar. Therefore, if the impulsive energy is great enough, the victim receiver will ring at its natural frequency with an envelope which is a reciprocal of its bandwidth. The IF bandwidth of the radars are, of course, the reciprocal of the radiated pulse width. This results in the victim receiver seeing the jammer pulses as though they were target returns from the point source targets illuminated by the radar. Further, the azimuth spatial extent of the decoyed signal will extend over the complex convolutions of the antenna patterns in the loop.

Similarly, considering the pulse recurrence frequencies of radars up to five kilohertz, and the pulse recurrence frequencies of long-range acquisition radars are typically on the order of five hundred pulses per second, a variety of interrogating pulses may be encountered by the jammer.

Referring to FIG. 5, the effect of the receipt of a variety of pulse widths and pulse recurrence frequencies by the jammer is illustrated. As shown, five interrogating pulses, indicated at 61 through 65, having various pulse recurrence frequencies and pulse widths are illustrated. If the pulse shaping and timing of the system of FIG. 1 is adjusted to produce a 190 microsecond pulse on the trailing edge of each of the received signals, the output of the system will be as indicated at trace 66 with the plurality of pulses bearing superscript numbers corresponding to the interrogating trace producing them. In the illustrative example each of the interrogating pulses is of a constant pulse repetition frequency but, of course, if one of the interrogating radars used a jittered or asynchronous pulse, the output of the system would also reflect this change. As may be seen, the extremely short pulse duration of the system of the invention permits handling of this hypothetical situation with no pulse overlap.

Of course, the limits of operational frequencies and ranges given in this description are only exemplary and may be altered for well-understood purposes of design and engineering value tradeoff. For example, considering the trigger blanking time as being set at less than the reciprocal of the maximum PRF, i.e. 190 microseconds, a deployable or expendable system may be made which has a designed mean time between failures on the order of ten to fifty hours. Such a system should be able to be overloaded for short time durations on the order of one to two minutes without failure. This overload would be consistent with high speed airborne missile target seeking radar scenarios and permit the system to be used as a decoy when deployed from aircraft to capture and deflect such missiles from their intended target trajectory.

The system of the invention may be manufactured from conventional parts and, at a low cost. For example. The broadband signal processor or front end of the trigger receiver portion of the invention may conveniently be manufactured from a train of solid state transistor amplifiers of the type known as ANW-4060 which have a 1 to 4 gigahertz bandwidth and provide approximately 30 decibels of gain with a 7 decibel noise figure. Conventional radar envelope detectors may be used for envelope detector 13 and threshold circuit 14 may be of the conventional DC bias type.

The foregoing descriptions taken together with the appended claims constitute a disclosure such as to enable persons skilled in the electronics and radar ranging arts and having the benefit of the teachings contained therein to make and use the invention. Further, the structure herein described meets the aforestated object of the invention and generally constitutes a meritorious advance in the art unobvious to such a person not having the benefit of these teachings.

What is claimed is:

1. A microwave signal system comprising:
   signal responsive means for producing an electrical output signal in response to ambient microwave energy;
   modulator circuit means connected to said signal responsive means so as to receive said electrical output signal for producing a drive signal having a predetermined time relationship to said ambient microwave energy;
   spark excited microwave generator means electrically connected to said modulator circuit means so as to receive said drive signal therefrom and constructed so as to be actuated thereby for producing a microwave output signal;
   microwave transmission means connected to said spark excited microwave generator means for transfer of the microwave output signal therefrom;
   tuning means connected to said microwave transmission means to produce a ringing resonance therein and selectively controlled to alter the frequency of the ringing resonance within predetermined limits; and
   load means connected to said microwave transmission means for receiving the microwave energy therefrom.

2. A microwave signal system according to claim 1 in which said signal responsive means includes an envelope detecting receiver.

3. A microwave signal system according to claim 2 in which said envelope detecting receiver is connected to the aforesaid modulator means by a threshold circuit.

4. A microwave signal system according to claim 1 in which said spark-excited microwave source includes a cavatron.

5. A microwave signal system according to claim 1 in which said spark-excited microwave source includes a travatron.

6. A microwave signal system according to claim 1 in which said tuning means includes a resonant length of transmission means further including a motor driven termination for altering the resonant frequency thereof.

7. A microwave system according to claim 6 in which said tuning means is connected to said transmission line at a distance from said spark excited microwave generating means of less than a transmitted pulsewidth.

8. A microwave signal system according to claim 1 in which said load means includes an antenna.

9. A microwave signal system according to claim 8 in which said antenna is connected to said microwave transmission means by a duplexer.

10. A microwave signal system according to claim 8 which further includes a radar homodyne receiver connected to said duplexer for receipt of echo returns from aforesaid antenna.

* * * * *